(12) United States Patent
Faccioni (10) Patent No.: US 9,177,539 B2
(45) Date of Patent: Nov. 3, 2015

(54) DEVICES FOR HARMONIZATION OF MECHANICAL AND ELECTROMAGNETIC OSCILLATIONS

(75) Inventor: Corrado Faccioni, Breganzona/Lugano (CH)

(73) Assignee: CORFAC2 S.A., Breganzona/Lugano (CH)

( * ) Notice: Subject to any disclaimer, the term of this patent is extended or adjusted under 35 U.S.C. 154(b) by 0 days.

(21) Appl. No.: 14/398,480

(22) PCT Filed: Jul. 4, 2012

(86) PCT No.: PCT/IB2012/053405
§ 371 (c)(1),
(2), (4) Date: Nov. 3, 2014

(87) PCT Pub. No.: WO2013/164666
PCT Pub. Date: Nov. 7, 2013

(65) Prior Publication Data
US 2015/0090102 A1      Apr. 2, 2015

(30) Foreign Application Priority Data
May 3, 2012   (IT) .............................. TO2012A0398

(51) Int. Cl.
*G10H 1/32*          (2006.01)
*F16F 15/06*         (2006.01)
(Continued)

(52) U.S. Cl.
CPC .. *G10H 1/32* (2013.01); *F16F 3/02* (2013.01); *F16F 7/10* (2013.01); *F16F 15/06* (2013.01); *G10C 3/06* (2013.01); *G10C 3/10* (2013.01); *G10D 3/02* (2013.01)

(58) Field of Classification Search
USPC .......................................................... 84/644
IPC ......................................................... G10H 1/32
See application file for complete search history.

(56) References Cited

U.S. PATENT DOCUMENTS 3,636,461 A *   1/1972   Sterzer .............................. 330/5
4,350,233 A *   9/1982   Buckley ........................ 188/378
(Continued)

FOREIGN PATENT DOCUMENTS

JP                60136639 A      7/1985

OTHER PUBLICATIONS

Michele Nardelli, Francesco Di Noto, On some equations concerning the Casimir Effect Between World-Branes in Heterotic M-Theory and the Casimir effect in spaces with nontrivial topology. Mathematical connections with some sectors of Number Theory, Università degli studi di Napoli Federico II, Dipartimento di Scienze della Terra e Dipartimento di Matematica ed Applicazioni.
(Continued)

*Primary Examiner* — David Warren
(74) *Attorney, Agent, or Firm* — Robert E. Alderson, Jr.

(57) ABSTRACT

Devices are provided for the harmonization of mechanical and electromagnetic oscillations, which include an outer body and an inner body, both having an axially symmetric shape relative to an axis (x). The inner body may be received inside a first cavity of the outer body so as to be firmly connected to the latter. The outer body and the inner body are made of, respectively, of stainless steel and copper, and may have a weight ratio equal to 3 or the number $\Phi$. The dimensions of the device may be such that their ratios are integers, or fractions thereof, or numbers corresponding to powers of $\Phi$ and/or $\pi$.

8 Claims, 7 Drawing Sheets

(51) Int. Cl.
*F16F 3/02* (2006.01)
*F16F 7/10* (2006.01)
*G10C 3/06* (2006.01)
*G10D 3/02* (2006.01)
*G10C 3/10* (2006.01)

(56) References Cited

U.S. PATENT DOCUMENTS

| | | | |
|---|---|---|---|
| 4,560,150 A * | 12/1985 | Shtarkman | 267/35 |
| 4,706,788 A * | 11/1987 | Inman et al. | 188/378 |
| 6,298,963 B1 | 10/2001 | Kim | |
| 7,306,082 B2 * | 12/2007 | Kwan et al. | 188/378 |
| 7,659,529 B2 * | 2/2010 | Figueroa | 250/504 R |
| 7,678,979 B1 | 3/2010 | Roop | |
| 8,474,572 B2 * | 7/2013 | de Lima | 181/207 |
| 9,057,415 B1 * | 6/2015 | Plangetis | 1/1 |
| 2004/0040432 A1 * | 3/2004 | Erickson et al. | 84/306 |
| 2005/0096882 A1 * | 5/2005 | Huang et al. | 702/191 |
| 2006/0195307 A1 * | 8/2006 | Huang et al. | 703/7 |
| 2006/0272912 A1 * | 12/2006 | Cai | 188/380 |
| 2009/0188370 A1 | 7/2009 | Dejule | |
| 2010/0079834 A1 * | 4/2010 | Jerman | 359/199.1 |
| 2015/0090102 A1 * | 4/2015 | Faccioni | 84/671 |

OTHER PUBLICATIONS

Michele Nardelli, Christian Lange, On some applications of the Einstein series in String Theory. Mathematical connections with some sectors of Number Theory and with Φ and π. Università degli studi di Napoli Federico II, Dipartimento di Scienze della Terra e Dipartimento di Matematica ed Applicazioni; Università degli studi di Kassel, Dipartimento di Ingegneria Meccanica.

Christian Lange, Michele Nardelli, Giuseppe Bini, Sistema Musicale Aureo Phi(n/7) e connessioni matematiche tra numeri primi e "Paesaggio" della Teoria delle Stringhe, Università degli studi di Kessel, Dipartimento di Ingegneria Meccanica, Università degli studi di Napoli Federico II, Dipartimento di Scienze della Terra, Dipartimento di Matematica ed Applicazioni, Conservatorio di Musica "N. Piccinni", Bari; Accademia Nazionale di "S. Cecilia", Roma.

* cited by examiner

| Measurements | *Phi | *2 | *3 | *4/3 | *3/2 | *9/4 | *5/2 | *5 | *5/3 |
|---|---|---|---|---|---|---|---|---|---|
| 2.00000 | - | - | - | - | - | - | 5.00000 | 10.00000 | 3.333333 |
| 3.33333 | - | - | 10.00000 | - | 5.00000 | 7.50000 | - | - | - |
| 4.63525 | 7.50000 | - | - | 6.18034 | - | - | - | - | - |
| 5.00000 | - | 10.00000 | - | - | 7.50000 | - | - | - | - |
| 6.18034 | 10.00000 | - | - | - | - | - | - | - | - |
| 6.47214 | 10.47214 | - | 19.41641 | - | - | 14.56231 | - | - | - |
| 7.50000 | - | - | - | 10.00000 | - | - | - | - | - |
| 10.00000 | - | - | - | - | - | - | - | - | - |
| 10.47198 | - | - | 31.41593 | - | 15.70796 | 23.56194 | - | - | - |
| 14.56208 | 23.56194 | - | - | 19.41611 | - | - | - | - | - |
| 15.70796 | - | 31.41593 | - | - | 23.56194 | - | - | - | - |
| 19.41611 | 31.41593 | - | - | - | - | - | - | - | - |
| 23.56194 | - | - | - | 31.41593 | - | - | - | - | - |
| 31.41593 | - | - | - | - | - | - | - | - | - |

DEVICES FOR HARMONIZATION OF MECHANICAL AND ELECTROMAGNETIC OSCILLATIONS

CROSS-REFERENCE TO RELATED APPLICATIONS

This application is a National Phase Application of PCT International Application No. PCT/IB2012/053405, International Filing Date, Jul. 4, 2012, claiming priority to Italian Patent Application No. TO2012A000398, filed May 3, 2012, each of which is hereby incorporated by reference in its entirety.

FIELD OF THE INVENTION

The present invention relates to a device designed to induce harmonization of both mechanical and electromagnetic oscillatory behaviour, in various objects made of various materials.

BACKGROUND OF THE INVENTION

In the prior art known to the Applicant, there is no method which can be universally and successfully used to improve oscillatory behaviour of any type, including both mechanical and electromagnetic behaviour.

SUMMARY OF THE INVENTION

The object of the present invention is therefore to propose a device capable of harmonizing both the mechanical and the electromagnetic oscillatory behaviour of various objects made of various materials.

This and other objects are fully achieved according to the present invention by devices described and claimed herein.

The invention has arisen from the observation that any type of movement of mechanical components induces oscillatory behaviour which contains both dissonant and resonant components, and that electromagnetic oscillations also contain within their spectrum subharmonics and harmonics which are either resonant or dissonant with respect to the base frequency or frequencies. For example, the superior harmonics emitted by a musical instrument are dependent on the type of instrument, and it is for this reason that a violin, for example, sounds different from a piano. However, both a piano and a violin can produce a more or less harmonic sound, depending on the proportions of resonant and dissonant components in the oscillation spectrum and the relations between these components. The more the individual harmonics in the oscillation spectrum of a musical instrument are integrated harmonically according to musical, and therefore mathematical, relations, the higher is the quality of the instrument. In the case of electromagnetic oscillations, the harmonization of the oscillatory behaviour results in a better quality, that is to say higher purity, of the transmitted signals.

The concepts of resonance and dissonance mentioned above will be understood more easily if reference is made to the Torkado model developed by the physicist Gabi Müller (www.torkado.de). Resonant oscillations are related to each other by frequency ratios defined by integers and fractions thereof (for example 1, 2, 3, 1/2, 1/3, 2/3, 3/4) and provide ideal energy absorption, while dissonant oscillations derive from frequency ratios defined by irrational numbers and provide energy transport with low resistance. Resonant phenomena and dissonant phenomena are observed in nature, and combine to form a harmonic unity.

In practice, the oscillations to which any object is subject often comprise non-harmonic oscillatory components, which are due to the different intrinsic resonance characteristics of the materials of the components from which the object is manufactured, and which, in combination, adversely affect the oscillatory behaviour of the object.

In order to harmonize the oscillatory behaviour, it is possible to attempt to deflect these non-harmonic components of the oscillation, but this will cause some of the oscillatory energy to be wasted and thus reduce the efficiency of an oscillating object. The approach on which the present invention is based is on the contrary that of acting in such a way that the resonant oscillatory components (based on ratios between integers) and the dissonant oscillatory components (based on irrational numbers) have wavelengths which overlap in a harmonic way, ideally in relation to the musical system $\Phi$ (that is to say, based on the number $\Phi$ (phi), otherwise known as the golden section or golden number), which is described below. The approach of ordering the dissonant and resonant components in a harmonic way by using a device whose dimensions are defined according to the basic mathematical model described hereafter makes it possible to avoid wasting the energy associated with the dissonant components of the oscillation, and thus to increase the efficiency of the oscillating object.

In addition to the dimensions, the materials of the device according to the invention must be suitably chosen so as to have characteristics enabling them to be put in a resonant and/or dissonant state. According to the researcher Frithjof Müller (http://www.aladin24.de/elemente/compton.htm), the resonance wavelength L of the electrons of an element is given by the following equation:

$$L = Z \cdot C_e \cdot 2^N,$$

where Z is the atomic number of the element, $C_e$ is the Compton wavelength of an electron ($C_e = h/(m_e \cdot c)$, where h is the Planck's constant, $m_e$ is the mass of the electron and c is the velocity of light), and N is an integer.

The above equation can also be used to calculate the resonance wavelength of the protons of an element, in which case the term $C_e$ is replaced with the Compton wavelength of a proton $C_p = h/(m_p \cdot c)$, where $m_p$ is the mass of the proton.

For example, according to the Frithjof Müller equation, a resonance wavelength for copper electrons (Z=29) is $L = 29 \cdot C_e \cdot 2^{31} = 151.1$ mm. The wavelength of 151.1 mm is also a resonance wavelength of iron protons (Z=26), because $L = 26 \cdot C_p \cdot 2^{42} = 151.1$ mm. Since the ratio between the atomic numbers Z of iron and copper is 26/29=0.89655, and the ratio between the mass of a proton and the mass of an electron is $m_p/m_e = 0.89655 \cdot 2^{11}$, the resonance wavelengths of the electrons of a copper atom are identical to those of the protons of an iron atom (as can be easily found by using different values of N). Consequently, the copper/iron material coupling is resonant, and therefore, as better explained below, the device according to the invention comprises a body (preferably the inner body) of copper and a body (preferably the outer body) of iron (or, better, steel).

If the device according to the invention is configured in such a way that the weight ratio between the steel body and the copper body is equal to 3, it follows that the volume ratio between the copper body (the density of which is approximately 8,900 kg/m³) and the steel body (the density of which is approximately 7,800 kg/m³) is approximately 2.629, which is a good approximation to the second power of $\Phi$ ($\Phi^2 = 2.618$). Consequently, the steel/copper coupling which is characteristic of the device according to the invention not only has the property of being an elementary resonance coupling, but also, owing to the ratio between the densities of these two materials, has the property of simultaneously meeting the condition according to which the weights of the two parts of the device must be in a ratio which is an integer (in particular, equal to 3), while the volumes of the two parts of the device are in the ratio $\Phi^2$. This creates a synergic effect of resonant ratios (3) and dissonant ratios ($\Phi^2$). Alternatively, it is possible, for example, to use a weight ratio between the steel body and the copper body of $\Phi$=1.618, in which case the volume ratio between the copper body and the steel body is 1.418, a value very close to the square root of 2 (=1.414). Ultimately, copper and steel have both resonant and dissonant characteristics, owing to their densities and their resonance wavelengths, and therefore constitute the preferred material coupling for the device according to the invention.

The device according to the invention is configured in such a way that the ratios between its characteristic dimensions are either integers and/or fractions of integers, thus resulting in resonant behaviour, or irrational numbers, corresponding to powers of $\Phi$, this resulting in dissonant behaviour. It is known that all the integers can be obtained by combining the powers of $\Phi$, as shown in the following examples:

$$\Phi^{-1}+\Phi^{-2}=1$$

$$\Phi+\Phi^{-2}=2$$

$$\Phi^2+\Phi^{-2}=3$$

$$\Phi^2+\Phi^{-2}+\Phi^0=4$$

By using the powers of $\Phi$, therefore, it is possible to obtain dimensional ratios equal to either integers or fractions of integers (ideal resonance, that is to say ideal energy transport) or irrational numbers (ideal dissonance, that is to say ideal energy absorption). The number $\Phi$ is also related to another well-known irrational number, namely $\pi$ (Greek letter pi), by the following relation based on the factor 1.2=6/5:

$$\Phi^2 \cdot 1.2=3.14164=\pi.$$

The ratios between the characteristic dimensions of the device according to the invention will therefore be advantageously defined not only on the basis of the number $\Phi$ and/or its powers or combinations, but also on the basis of the number $\pi$.

As regards the resonant ratios (in other words the ratios expressed by integers or fractions of integers), it is advantageous to select typical musical ratios as far as possible, for example 4/3, 3/2, 5/3, 2, 3, and the like.

In terms of construction, it will be necessary to have a series of numbers available containing the largest possible number of resonant and dissonant connections, in addition to connections with the number $\pi$, in order to design a device whose characteristic dimensions are in the ratios to each other defined above. For this purpose, it is advantageous to use the musical system $\Phi$ mentioned above. Various musical systems based on the number $\Phi$ have been developed in recent years. The system described in 2008 by Christian Lange, Michele Nardelli and Giuseppe Bini (in an article entitled "Sistema Musicale Aureo Phi$^{(n/7)}$ e connessioni matematiche tra numeri primi e "Paesaggio" della Teoria delle Stringhe") includes some important connections. This system has been extended with the introduction of further connections. The connection with $\pi$ was obtained by introducing the concept of the semitone into the same system (in the article by Christian Lange and Michele Nardelli entitled "On some applications of the Eisenstein series in String Theory. Mathematical connections with some sectors of Number Theory and with $\Phi$ and $\pi$"). In a very recent study (February 2012), "On some equations concerning the Casimir Effect Between World-Branes in Heterotic M-Theory and the Casimir effect in spaces with nontrivial topology. Mathematical connections with some sectors of Number Theory", Michele Nardelli and Francesco Di Noto discuss some connections between numbers belonging to the latest version of the musical system based on $\Phi$ and $\pi$, which was developed by Christian Lange using a different base function and which contains even more connections with $\Phi$, with $\pi$ and with harmonic numbers.

In order to create a numeric code with musical properties based on the ratio $\Phi$ interconnected with $\pi$, the following mathematical function with base $\Phi$ is used:

$$f(x)=\Phi \cdot (n/x),$$

where x is the total number of notes in the interval $\Phi$, and n is an integer.

For example, imposing that x=7, the following table is obtained:

| n | x | f(x) |
|---|---|------|
| 0 | 7 | 1.000000 |
| 1 | 7 | 1.071163 |
| 2 | 7 | 1.147389 |
| 3 | 7 | 1.229040 |
| 4 | 7 | 1.316502 |
| 5 | 7 | 1.410188 |
| 6 | 7 | 1.510540 |
| 7 | 7 | 1.618034 |
| 8 | 7 | 1.733177 |
| 9 | 7 | 1.856515 |
| 10 | 7 | 1.988629 |
| 11 | 7 | 2.130145 |
| 12 | 7 | 2.281731 |
| 13 | 7 | 2.444105 |
| 14 | 7 | 2.618034 |
| 15 | 7 | 2.804340 |
| 16 | 7 | 3.003904 |
| 17 | 7 | 3.217669 |
| 18 | 7 | 3.446647 |
| 19 | 7 | 3.691919 |
| 20 | 7 | 3.954645 |
| 21 | 7 | 4.236068 |

This contains the powers of $\Phi$ for n=0, n=7, n=14 and n=21 (an intrinsic condition of the function itself, once x=7 is specified), while for n=16 a value of 3.0039 is obtained, which is nearly equal to 3. This approximate value can be corrected (microtuned) by using sums of powers of $\Phi$:

$$\Phi^2+\Phi^{-2}=3.0000.$$

Similarly, the value of 1.988629 obtained with n=10 can be corrected by:

$$\Phi+\Phi^{-2}=2.0000.$$

The base function, on which these microtunings are performed, must intrinsically contain values which are good approximations of integers. The more integer values the selected function contains, the easier it will be to obtain numerous harmonic ratios in addition to those represented by powers of $\Phi$.

The invention will now be described by way of non-limiting examples with reference to the attached drawings briefly described below.

DETAILED DESCRIPTION

Figure 1:
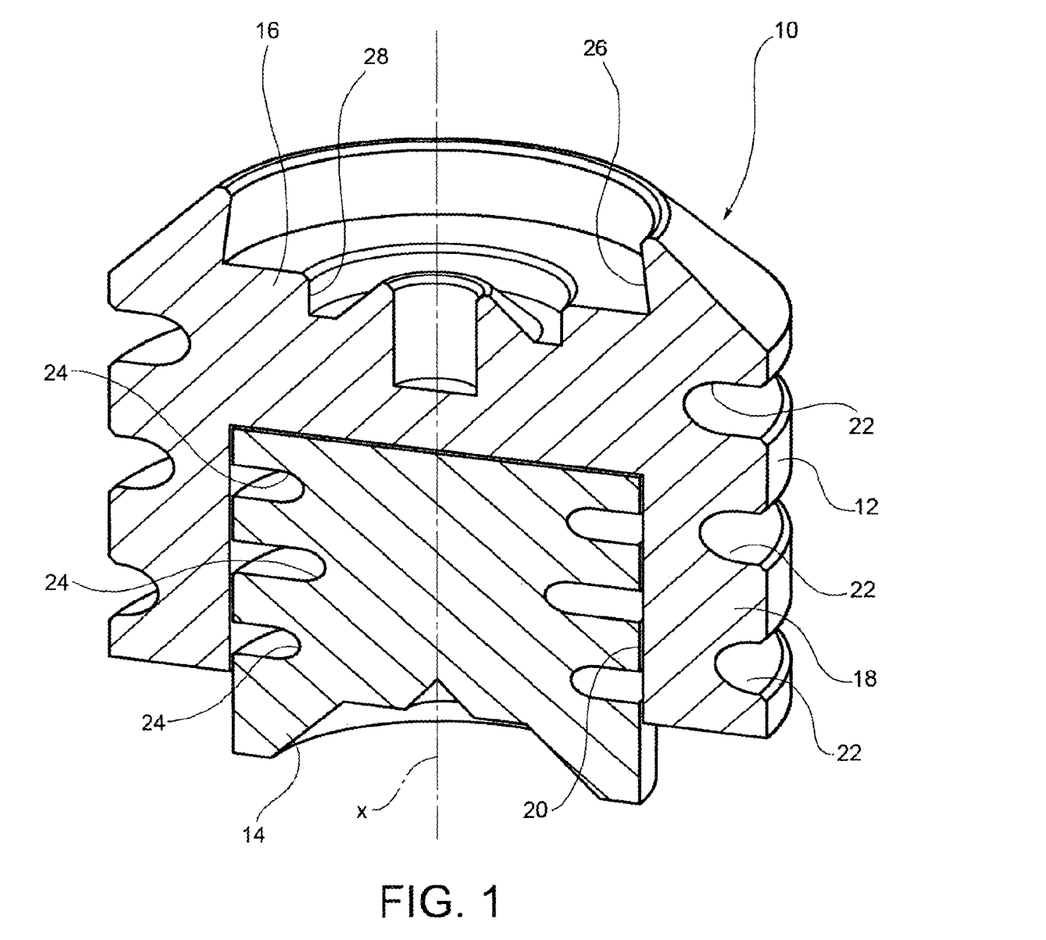
FIG. 1 is a perspective view of a device for the harmonization of mechanical and electromagnetic oscillations according to a preferred embodiment of the present invention, the device being shown in a cross-sectional view taken on a plane passing through its axis.

With initial reference to FIG. 1, a device for the harmonization of mechanical and electromagnetic oscillations according to a preferred embodiment of the present invention is generally indicated 10, and comprises an outer body 12 and an inner body 14, both of which are axially symmetric with respect to the same axis of symmetry x. The outer body 12 has a shape which is substantially that of an inverted cup, with a base 16 extending perpendicular to the axis x and with a skirt 18 of cylindrical shape which extends downwards from the base 16 and defines inside it a cylindrical cavity 20. The inner body 14 is substantially a solid cylindrical body and is interference-fitted into the cavity 20 so as to be firmly connected to the outer body 12. On the outer lateral surface of the skirt 18 of the outer body 12 there is provided a plurality of circumferential grooves 22 (preferably three in number), which in the illustrated embodiment have depths differing from each other, in particular an increasing depth from the bottom to the top, in the sense that the lowermost groove 22 has the smallest depth, while the uppermost groove 22 has the greatest depth. Similarly, on the outer lateral surface of the inner body 14 there is provided a plurality of circumferential grooves 24 (preferably three in number), which in the illustrated embodiment have different depths from each other. More specifically, in the illustrated embodiment the lowermost and uppermost grooves 24 have the same depth, which is less than the depth of the intermediate groove 24. The grooves 22 and/or 24 could be omitted, but it has been found that their presence increases the efficiency of the device.

The inner body 14 has a greater height than that of the cavity 20, and therefore projects downwards with respect to the base of the outer body 12. In the base 16 of the outer body 12 there is provided a cavity 26, which is upwardly open and has a generally cylindrical shape with its axis coinciding with the axis x.

One of the outer body 12 and the inner body 14 is made of steel and the other is made of copper. Preferably, the outer body 12 is made of steel and the inner body 14 is made of copper, but the materials of the two bodies could be reversed. The steel used is preferably stainless steel.

Figure 2:
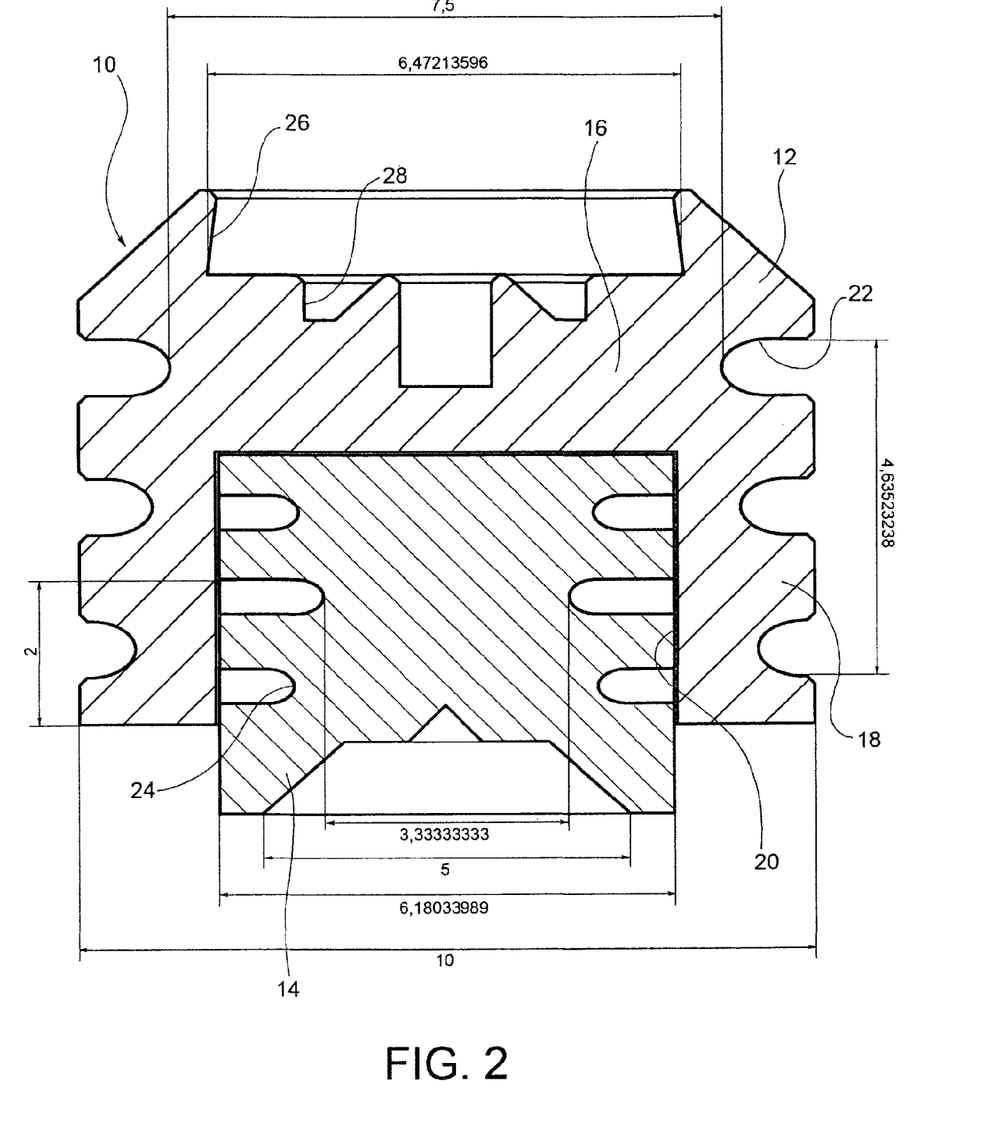
FIG. 2 is a cross-sectional view of the device of FIG. 1, showing the values of some of the characteristic dimensions of the device.

FIG. 2 shows the values chosen for some of the characteristic dimensions of the device of FIG. 1, these values being taken from the latest version of the aforesaid musical system based on Φ and π. For example, the outside diameter of the outer body 12 is equal to 10, the diameter of the cylindrical cavity 20 is equal to 6.18034, the diameter of the cavity 26 is equal to 6.47213, the inside diameter (minimum diameter) of the upper groove 22 is equal to 7.5, the inside diameter (minimum diameter) of the intermediate groove 24 is equal to 3.33333, the distance between each pair of adjacent grooves 22 is equal to 2, and so on. The measurements stated here represent values by which a basic measurement, advantageously equal to 7.2 mm, is to be multiplied.

Figure 3:
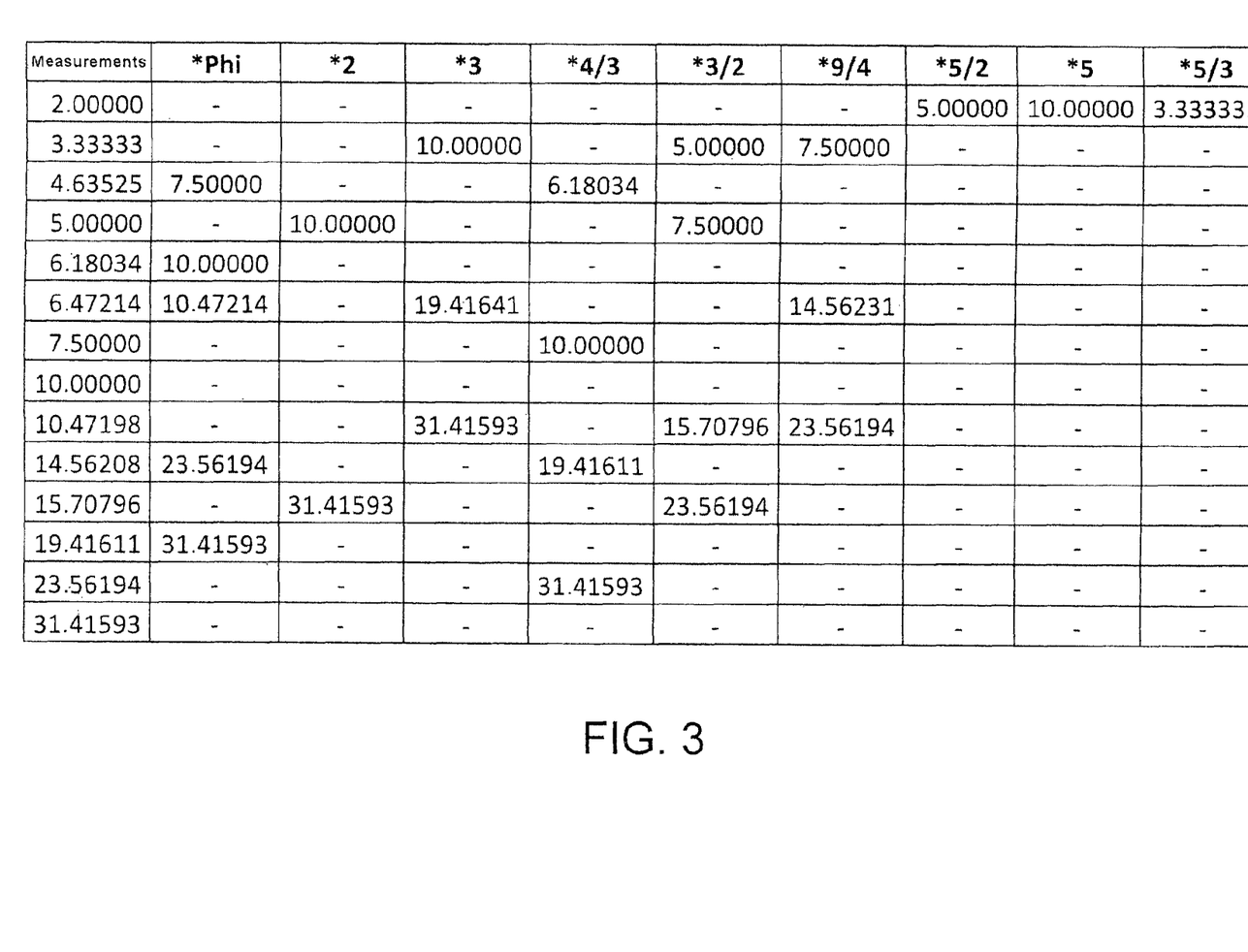
FIG. 3 shows, in tabular form, the connections of some of the characteristic measurements of the device of FIG. 1 with the number Φ and with some harmonic ratios.

The table in FIG. 3 shows the connections of some of the characteristic measurements of the aforementioned device 10 with the number Φ and with some harmonic ratios, in particular 2, 3, 4/3, 3/2, 9/4, 5/2, 5 and 5/3. The system of numbers in this table also shows connections with the number π. For example, the number 10.47214 is equal to the product of 6.47214 and Φ as well as to the product of 3.33333 and π, and similarly the number 14.56231 is equal to the product of 6.47214 and 9/4 as well as to the product of 4.63525 and π, and so on.

Figure 4:
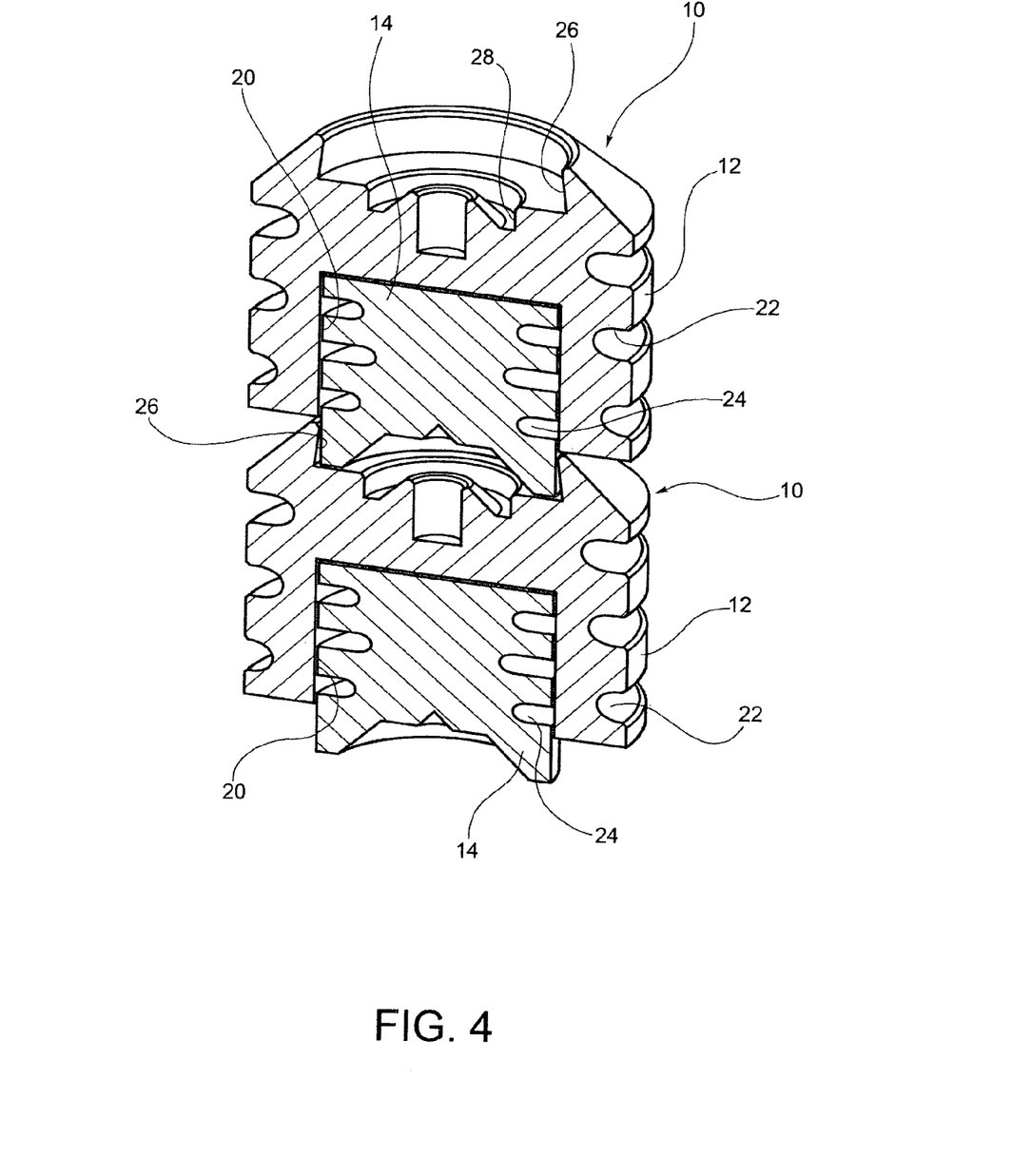
FIG. 4 is a perspective view of the assembly formed by two identical devices of the type shown in FIG. 1, positioned by stacking one on another, the devices being shown in a cross-sectional view taken on the plane passing through their axis.
Figure 5:
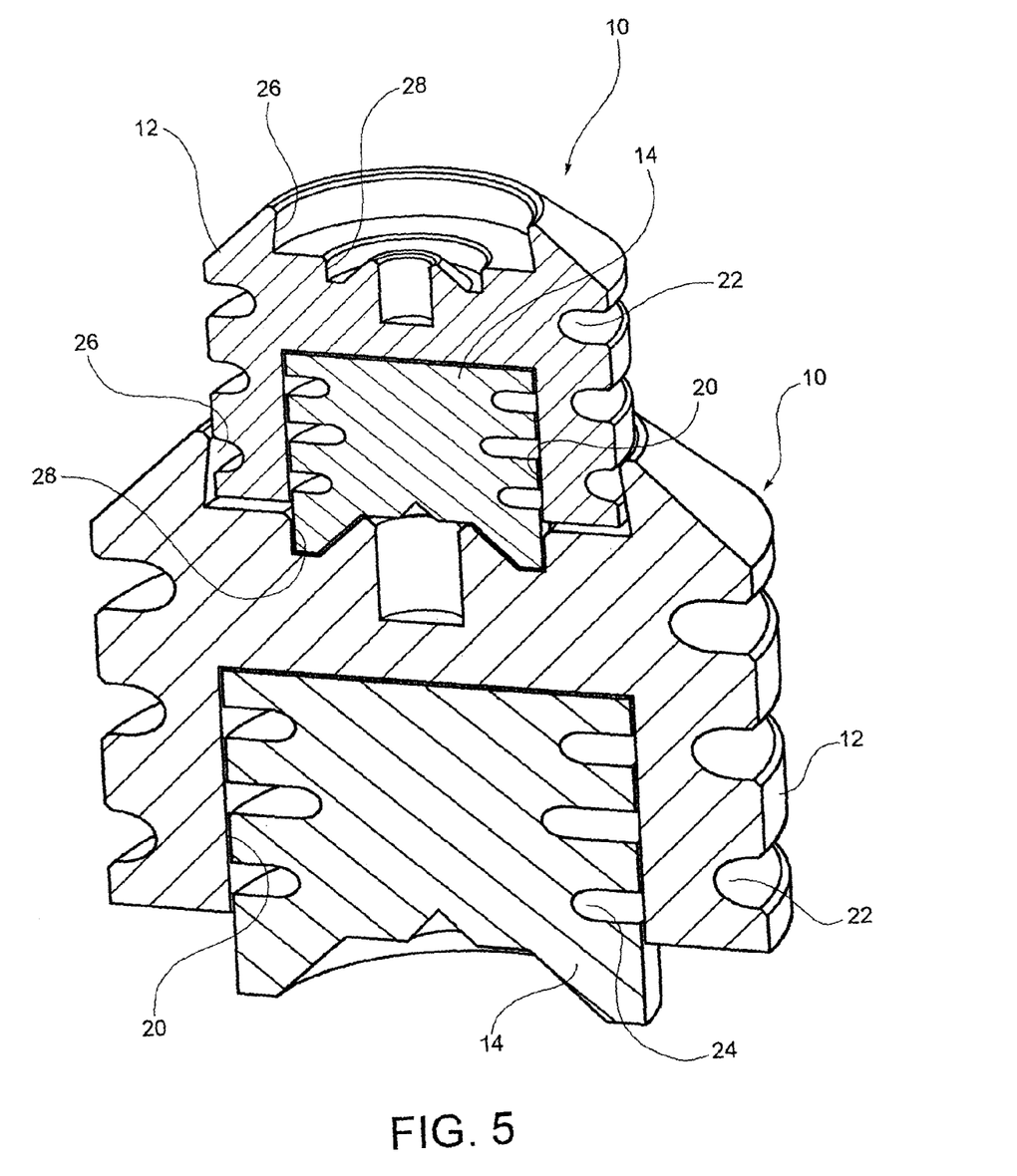
FIG. 5 is a view similar to that of FIG. 4, with the difference that in this case the two devices are not identical, but one is larger than the other.

As shown in FIGS. 4 and 5, the cavity 26 provided in the base 16 of the outer body 12 allows two or more devices 10 to be stacked on each other. In this connection, it has been found that when a plurality of devices is connected in series in the manner shown in FIGS. 4 and 5 the efficiency of the devices increases. FIG. 4 shows the stacked arrangement of two devices 10 having identical dimensions, in which case the part of the inner body 14 of the upper device which projects downwards from the outer body 12 is received in the cavity 26 of the lower device. In the example of FIG. 5, on the contrary, the upper device is smaller than the lower one. In this case, the outer body 12 of the upper device is partially received in the cavity 26 of the lower device and the part of the inner body 14 of the upper device which projects downwards from the outer body 12 is received in a further cavity 28, having a smaller diameter than that of the cavity 26, provided in the base 16 of the device.

Figure 6:
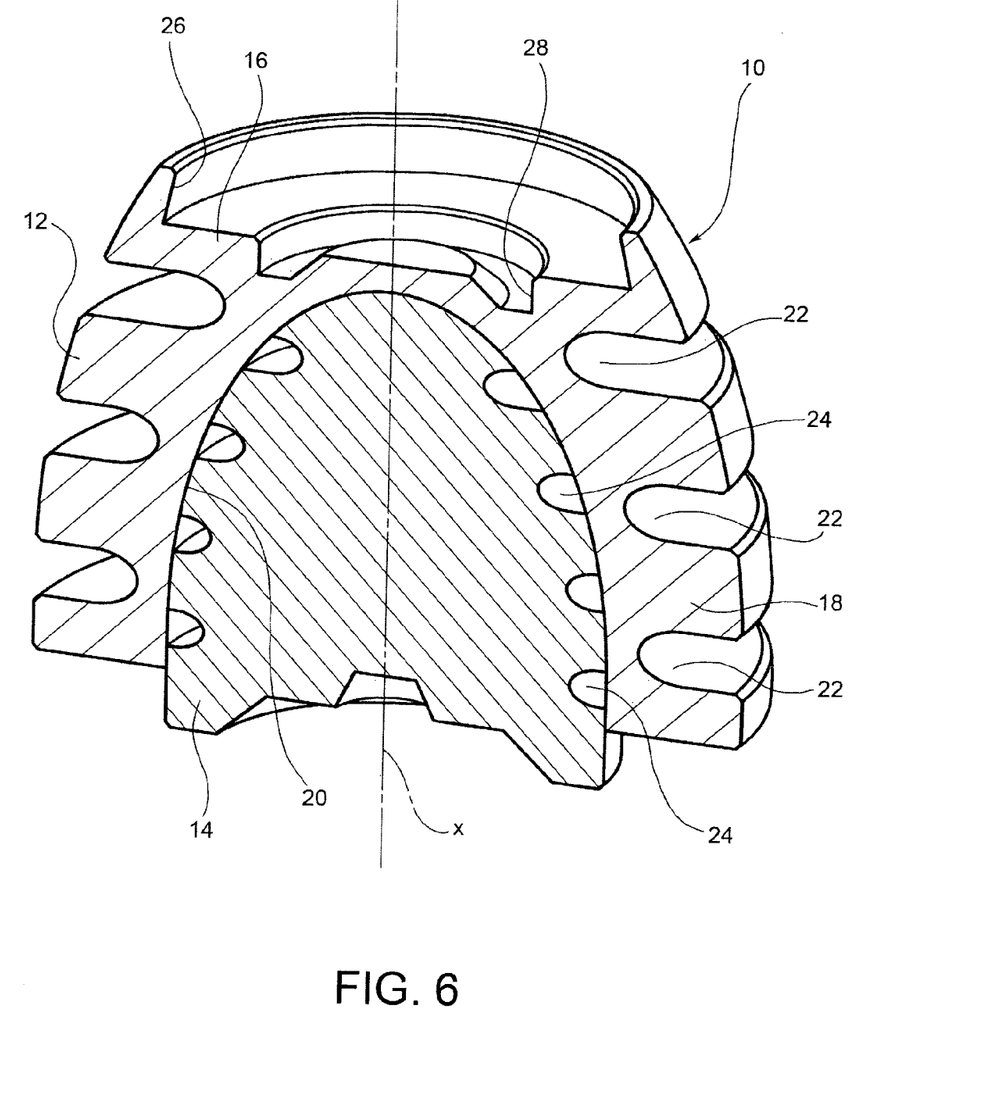
FIGS. 6 and 7 are, respectively, a perspective view and a cross-sectional view of a device for the harmonization of mechanical and electromagnetic oscillations according to a further embodiment of the present invention.
Figure 7:
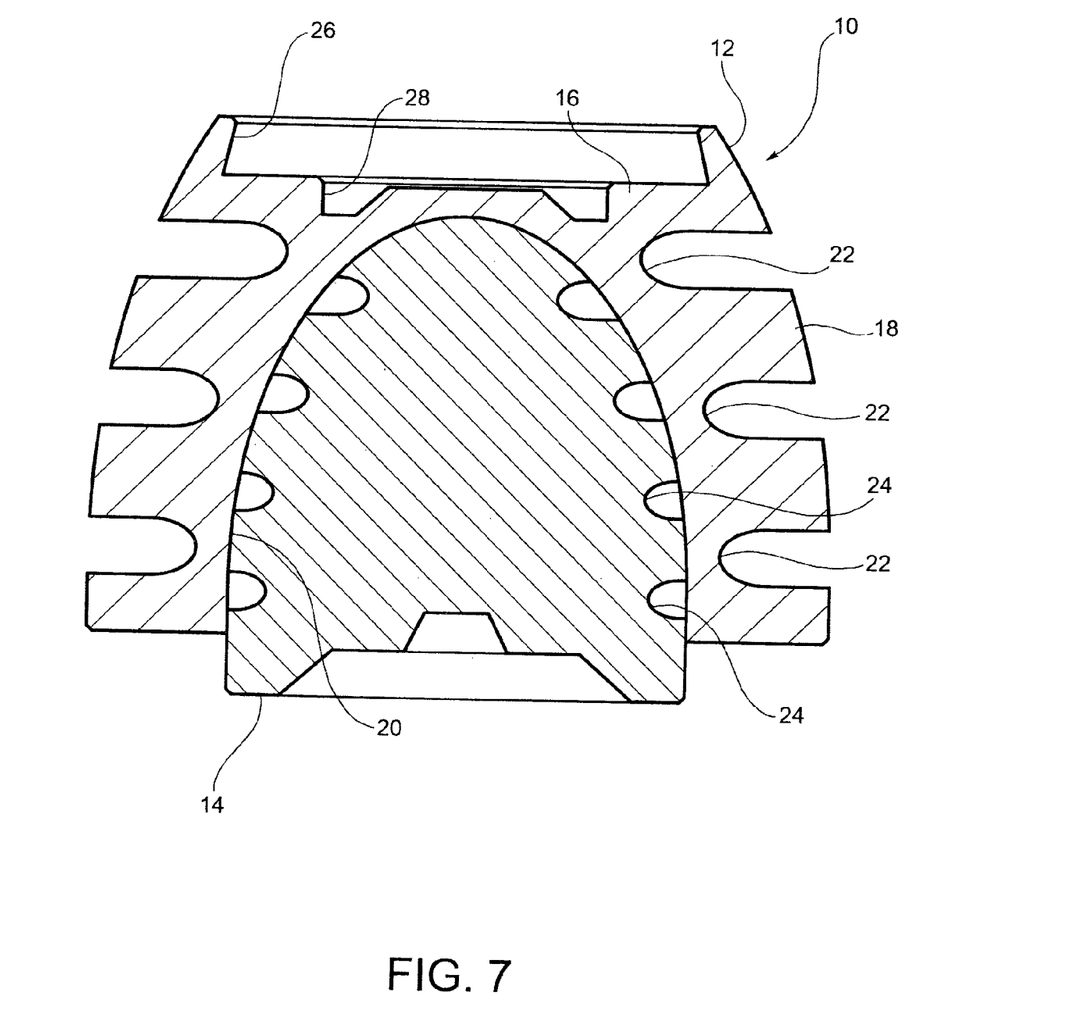

FIGS. 6 and 7, in which parts which are identical to, or correspond to, those of FIGS. 1 and 2 have been given the same reference numerals, show a further embodiment of the device according to the invention. In this further embodiment of the device 10, the outer body 12 and the inner body 14 are also made as solids of revolution about the axis x. However, by contrast with the embodiment described above with reference to FIGS. 1 and 2, the meridian curves which define the outer body 12 and the inner body 14 by revolution about the axis x are not straight lines but curved lines. In particular, in the proposed embodiment, both the outer body 12 and the inner body 14 are egg-shaped.

Alternatively, it is possible to provide a device having a cylindrical outer body and an egg-shaped inner body, or vice versa.

The device according to the invention has been tested by the applicant in many different applications and has always proved highly effective in improving the behaviour of bodies and systems subject to mechanical and/or electromagnetic oscillations.

For example, the application of one or more devices according to the invention to musical instruments (whether acoustic or electric/electronic), acoustic boxes, headphones, or electrical amplifiers provides a marked improvement in both the sound quality and the acoustic spectrum.

The application of one or more devices according to the invention to electrical components such as connecting or power supply cables, transformers, mains supply units, printed circuits, computers or the like enables the performance of these components to be optimized. For example, the transfer of digital images from a hard disk to a screen is substantially improved, or the reproduction of the images is markedly clearer, if one or more devices according to the invention are applied to the hard disk, the connecting cable and/or the screen. In the case of cables, regardless of whether they are connecting cables or power supply cables, it is advantageous to use two devices, placed on diametrically opposite sides of the cable.

Naturally, the principle of the invention remaining the same, the embodiments and details of construction may be varied widely with respect to those described and illustrated purely by way of non-limiting example, without thereby departing from the scope of the invention as defined in the attached claims.

For example, the device can be made as an integral part of a system subject to mechanical and/or electromagnetic oscillations. In this connection, the device can be made, for example, in the form of a screw, in which case the outer body of the device will form the head and the threaded shank of the screw and the inner body will be inserted into an axial hole provided inside the shank of the screw.

The device can also be made, for example, in the form of a knob of a potentiometer of an amplifier or other electrical or electronic circuit.

The invention claimed is:

1. A device for harmonization of mechanical and electromagnetic oscillations, comprising an outer body and an inner body, both having an axially symmetric shape relative to an axis (x), wherein the inner body is received inside a first cavity of the outer body so as to be firmly connected to the latter, wherein one of the outer body and the inner body comprises steel and the other comprises copper, and wherein the dimensions of the device are such that their ratios are either integers, or fractions thereof, or numbers corresponding to powers of Φ and/or of π.

2. The device of claim 1, wherein the steel comprises stainless steel.

3. The device of claim 1, wherein the outer body comprises steel and the inner body comprises copper.

4. The device of claim 3, wherein the ratio of the weight of the outer body to the weight of the inner body is equal to 3 or Φ.

5. The device of claim 1, wherein the outer body has an inverted-cup shape, with a base extending perpendicular to the axis (x) and has a skirt of cylindrical shape which extends downward from the base and defines inside it said first cavity, and wherein the inner body is a solid cylindrical body and is interference-fitted into said first cavity.

6. The device of claim 1, wherein the outer body and the inner body are egg-shaped bodies.

7. The device of claim 1, wherein the inner body projects downward from the outer body and wherein the outer body has at its top a second cavity adapted to receive the part of the inner body which projects downward from the outer body, thereby allowing a plurality of the devices to be stacked on each other.

8. The device of claim 1, wherein the outer body and/or the inner body have on their respective lateral surfaces a plurality of circumferential grooves.

\* \* \* \* \*